US011288529B2

(12) United States Patent
Mobasser

(10) Patent No.: US 11,288,529 B2
(45) Date of Patent: Mar. 29, 2022

(54) SYSTEMS AND METHODS FOR DETERMINING VEHICLE OCCUPANCY RATE

(71) Applicant: Fortran Traffic Systems Limited, Toronto (CA)

(72) Inventor: Farid Mobasser, Toronto (CA)

(73) Assignee: Fortran Traffic Systems Limited, Toronto (CA)

( * ) Notice: Subject to any disclaimer, the term of this patent is extended or adjusted under 35 U.S.C. 154(b) by 413 days.

(21) Appl. No.: 16/402,483

(22) Filed: May 3, 2019

(65) Prior Publication Data

US 2019/0384995 A1    Dec. 19, 2019

Related U.S. Application Data

(60) Provisional application No. 62/685,589, filed on Jun. 15, 2018.

(51) Int. Cl.
| | | |
|---|---|---|
| *G06K 9/00* | (2006.01) | |
| *B60W 40/13* | (2012.01) | |
| *H04W 4/80* | (2018.01) | |
| *H04W 4/40* | (2018.01) | |
| *B60N 2/00* | (2006.01) | |

(52) U.S. Cl.
CPC ......... *G06K 9/00838* (2013.01); *B60N 2/002* (2013.01); *B60W 40/13* (2013.01); *H04W 4/40* (2018.02); *H04W 4/80* (2018.02)

(58) Field of Classification Search
CPC ...... G06K 9/00838; H04W 4/80; H04W 4/40; B60N 2/002; B60W 40/13

USPC .......................................................... 701/1
See application file for complete search history.

(56) References Cited

U.S. PATENT DOCUMENTS

| | | | |
|---|---|---|---|
| 7,388,501 B2 | 6/2008 | Tang et al. | |
| 8,280,791 B2 | 10/2012 | Davis, III | |
| 10,809,721 B2* | 10/2020 | Urano | ................... G05D 1/0088 |
| 2003/0209893 A1* | 11/2003 | Breed | .................. B60N 2/0248 |
| | | | 280/735 |
| 2010/0085213 A1 | 4/2010 | Tumock et al. | |
| 2011/0178673 A1 | 7/2011 | Nakamura et al. | |
| 2013/0006725 A1 | 1/2013 | Simanek et al. | |
| 2015/0088618 A1 | 3/2015 | Basir et al. | |
| 2016/0297324 A1 | 10/2016 | Taylor et al. | |

(Continued)

*Primary Examiner* — Krishnan Ramesh
(74) *Attorney, Agent, or Firm* — Bereskin & Parr LLP/S.E.N.C.R.L., s.r.l.

(57) ABSTRACT

Various embodiments are described herein for methods, devices and systems that can be used to determine an occupancy count for a vehicle. In at least one embodiment, the method includes receiving a plurality of data signals from a corresponding one or more occupancy data sources, storing a plurality of occupancy data source records corresponding to each received data signal analyzing the plurality of occupancy data signals to identify a state of each occupancy data source for a duration of time marked by a starting time and a stopping time of the vehicle, processing the plurality of occupancy data signals based on the identified state of the corresponding occupancy data source; generating an estimated occupancy count; providing a signal corresponding to the estimate occupancy count to a display system for verification by at least one occupant of the vehicle and receiving a verification input from the at least one occupant.

19 Claims, 10 Drawing Sheets

(56) References Cited

U.S. PATENT DOCUMENTS

| | | | |
|---|---|---|---|
| 2017/0178416 A1* | 6/2017 | Barreira Avegliano | ............... G07B 15/06 |
| 2017/0284814 A1* | 10/2017 | Gaither | .............. G01C 21/3676 |
| 2017/0309093 A1* | 10/2017 | Feng | .................... B60W 50/02 |
| 2018/0109399 A1* | 4/2018 | Cardoso de Moura | ............... H04W 28/14 |
| 2018/0109926 A1* | 4/2018 | Liu | ....................... G01S 19/252 |
| 2018/0211124 A1* | 7/2018 | Rakah | ..................... G06Q 50/30 |
| 2019/0020556 A1* | 1/2019 | Pefkianakis | ............ H04L 43/16 |
| 2019/0215378 A1* | 7/2019 | Munishwar | ........... H04W 4/027 |
| 2019/0266894 A1* | 8/2019 | O'Sullivan | .......... G06Q 10/025 |

* cited by examiner

SYSTEMS AND METHODS FOR DETERMINING VEHICLE OCCUPANCY RATE

FIELD

The described embodiments relate to systems and methods for determining the number of occupants in a vehicle.

BACKGROUND

Some systems and methods for detecting vehicle occupancy may rely on determining the number of door slams, or more intrusive techniques, such as using in-vehicle or roadside cameras. Consequently, the conventional systems and methods are typically inefficient and invasive. There is a need for systems and methods to determine vehicle occupancy rate in a non-intrusive, inexpensive and accurate manner.

SUMMARY

In one aspect of the invention, there is a method of determining an occupancy count for a vehicle, the occupancy count corresponding to a number of occupants in a vehicle, the method being implemented by a transponder located in the vehicle, the transponder including a processor and a memory coupled to the processor and in which to store instructions executable by the processor. The method includes receiving, at the processor, a plurality of occupancy data signals from a corresponding at least one occupancy data sources; storing, in the memory, a plurality of occupancy data source records, each occupancy data source record corresponding to each occupancy data signal received at the processor; analyzing, at the processor, the plurality of occupancy data signals to identify an input state of each of the at least one occupancy data sources for a duration of time, the duration of time being marked by a starting time and a stopping time of the vehicle; comparing the plurality of occupancy data signals based on the identified input state of the corresponding occupancy data source; and establishing the occupancy count corresponding to the vehicle based on the processing of the plurality of occupancy data signals.

In a feature of that aspect, the method further includes updating the occupancy count, by the processor, based on a user input received at a user interface corresponding to the transponder. In another feature, the at least one occupancy data source includes an engine control unit monitoring an engine of the vehicle, and the method further includes monitoring, by the engine control unit, one or more engine parameters corresponding to the vehicle; receiving, at the processor, a data value corresponding to each of the one or more engine parameters; and determining, by the processor, mass of the vehicle based on the received data values.

In still another feature, the at least one engine parameter includes the speed of the vehicle. In a still further feature, the at least one engine parameter includes engine load data from the engine of the vehicle. In another feature, the at least one engine parameter includes rotational speed (engine RPM) of the vehicle. In another feature, the at least one engine parameter includes throttle position of the vehicle. In still yet another feature, the transponder further includes an accelerometer, and the method includes: receiving, by the processor, acceleration data corresponding to acceleration of the vehicle from the accelerometer. In a further feature, the method includes determining, by the processor, a plurality of gear levels corresponding to the vehicle based on a ratio of the rotational speed (engine RPM) of the vehicle to the speed of the vehicle; and determining, by the processor, for each gear level, a vehicle mass based on the acceleration data, throttle position and engine load.

In another feature, the at least one occupancy data source includes an electronic device coupled to the vehicle via an auxiliary connection. The electronic device is operable to communicate with the vehicle. The method includes: receiving, by the processor, at least one auxiliary connection information signal from at least one electronic device; determining a signal strength of the at least one auxiliary connection information signal; determining the location of the at least one electronic device based on the signal strength of the at least one auxiliary connection information signal; and if the location of the at least one electronic device is determined to be within the vehicle, determining the occupancy count of the vehicle based on the at least one electronic device. In another feature, the auxiliary connection includes a Bluetooth connection. The at least one auxiliary connection information signal includes a Bluetooth signal.

In another feature, the at least one occupancy data source includes a seat belt sensor array corresponding to the vehicle. The seat belt sensor array has one or more seat belt sensors. Each seat belt sensor is uniquely associated with a seat and is configured to detect engagement of the corresponding seat belt. The method further includes: receiving, by the processor, at least one seat belt information signal from a corresponding seat belt sensor; and determining the occupancy count of the vehicle based on the at least one seat belt information signal.

In a further feature, the method further includes: receiving, by the processor, at least one pressure sensor information signal from a corresponding pressure sensor; determining, by the processor, if a pressure sensor corresponding to the at least one seat belt sensor transmitting the at least one seat belt information signal is engaged; and determining the occupancy count of the vehicle based on the at least one seat belt information signal and the corresponding pressure sensor information signal.

In yet another feature, the at least one occupancy data source includes at least one mobile device associated with an occupant of the vehicle, and the method further includes: receiving, by the processor, a plurality of incoming data packets from a plurality of mobile devices coupled to the vehicle, wherein each incoming data packet corresponding to a same mobile device comprising a signature uniquely corresponding to that mobile device; analyzing each of the plurality of incoming data packets based on the corresponding signature; and determining the occupancy count of the vehicle based on the analysis of each incoming data packet. In another feature, the unique signature includes a unique MAC address associated with each mobile device.

In a still further feature, the method further includes: determining, by the processor, a signal strength associated with each incoming data packet; comparing the signal strength of each incoming data packet to a predetermined threshold signal strength; filtering the incoming data packets based on the corresponding signal strengths to generate filtered data packets; and determining the occupancy count of the vehicle based on the filtered data packets.

In another aspect, in at least one embodiment described herein, there is provided a transponder system for determining an occupancy count for a vehicle, the occupancy count corresponding to a number of occupants in a vehicle. The transponder system includes a processor unit; and a memory unit coupled to the processor unit and configured to store instructions executable by the processor unit, where the processor unit is configured to: receive a plurality of occupancy data signals from a corresponding at least one occupancy data sources; store, in the memory, a plurality of occupancy data source records, each occupancy data source record corresponds to each occupancy data signal received at the processor; analyze the plurality of data signals to identify an input state of each of the at least one occupancy data sources for a duration of time, the duration of time being marked by a starting time and a stopping time of the vehicle; compare the plurality of occupancy data signals based on the identified input state of the corresponding occupancy data source; and establish the occupancy count corresponding to the vehicle based on the processing of the plurality of occupancy data signals.

In another embodiment, the processor unit is configured to perform the method as defined above or other methods in accordance with the teachings herein.

In another aspect, in at least one embodiment described herein, there is provided a computer-readable medium storing computer-executable instructions, the instructions for causing a processor to perform a method of determining an occupancy count for a vehicle, the occupancy count corresponding to a number of occupants in a vehicle, by receiving a plurality of occupancy data signals from a corresponding at least one occupancy data sources; storing, in the memory, a plurality of occupancy data source records, each occupancy data source record corresponds to each occupancy data signal received at the processor; analyzing the plurality of occupancy data signals to identify an input state of each of the at least one occupancy data sources for a duration of time, the duration of time being marked by a starting time and a stopping time of the vehicle; comparing the plurality of data signals based on the identified input state of the corresponding data source; and establishing the occupancy count corresponding to the vehicle based on the processing of the plurality of occupancy data signals.

In another embodiment, the instructions cause the processor to perform the methods as described above or other methods in accordance with the teachings herein.

In another aspect, in at least one embodiment described herein, there is provided a vehicle occupancy monitor assembly comprising at least one vehicle identifier uniquely associated with a vehicle; a set of input sensors uniquely associated with the at least one vehicle identifier; a set of datum records; a processor; a location sensor positioned to detect the presence of the vehicle on a path; a vehicle identification sensor operable to poll for the at least one vehicle identifier in the vehicle on the path; and the processor being operable to compare (a) data from the set of input sensors uniquely associated with the at least one vehicle identifier, with (b) the set of datum records indicative of occupancy of the vehicle.

In some embodiments, the at least one vehicle identifier includes at least one of (a) a vehicle-mounted transponder; (b) a personal electronic member; and (c) a vehicle registration plate. In some embodiments, the set of input sensors includes at least one of: (a) an actively controlled operator input interface; (b) a seat belt sensor; (c) a weight sensor; (d) an electronic device emission sensor; (e) a cabin compartment motion sensor; (f) a cabin compartment thermal sensor; (g) a cabin compartment voice sensor; (h) a cabin compartment CO2 sensor; (i) an optical sensor; (j) a capacitance detector; and (k) a proximity sensor. In some embodiments, the set of datum records includes a corresponding base-line unoccupied vehicle reference value for each the sensor.

In some embodiments, the set of input sensors includes at least the actively controlled operator input interface and at least one other of the items (b) to (k) and the processor includes a comparator operable to determine consistency between input entered at the actively controlled operator input interface and inputs obtained from the at least one other of the items (b) to (k). In some embodiments, the assembly further includes a vehicle mounted information aggregator to aggregate the inputs obtained from at least one of the items (b) to (k). In some embodiments, the actively controlled operator input interface is operable to receive an occupant number input from an operator of the vehicle. In some embodiment, the operator input interface is one of (a) text activated; (b) voice activated; and (c) touch activated. In some embodiments, the assembly further includes a personal electronic apparatus within the vehicle, the personal electronic apparatus being in communication with the vehicle, and being in communication with a communication station external to the vehicle. In some embodiments, the operator input interface is provided within the personal electronic apparatus. The personal electronic apparatus is configured to transmit an alert to the communication station the number of occupants entered by the actively controlled operator input and if inconsistency between the input entered at the actively controlled operator input interface and inputs obtained from the at least one other of the items (b) to (k) is detected.

Other aspects and features will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from the detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings in which.

Figure 1:
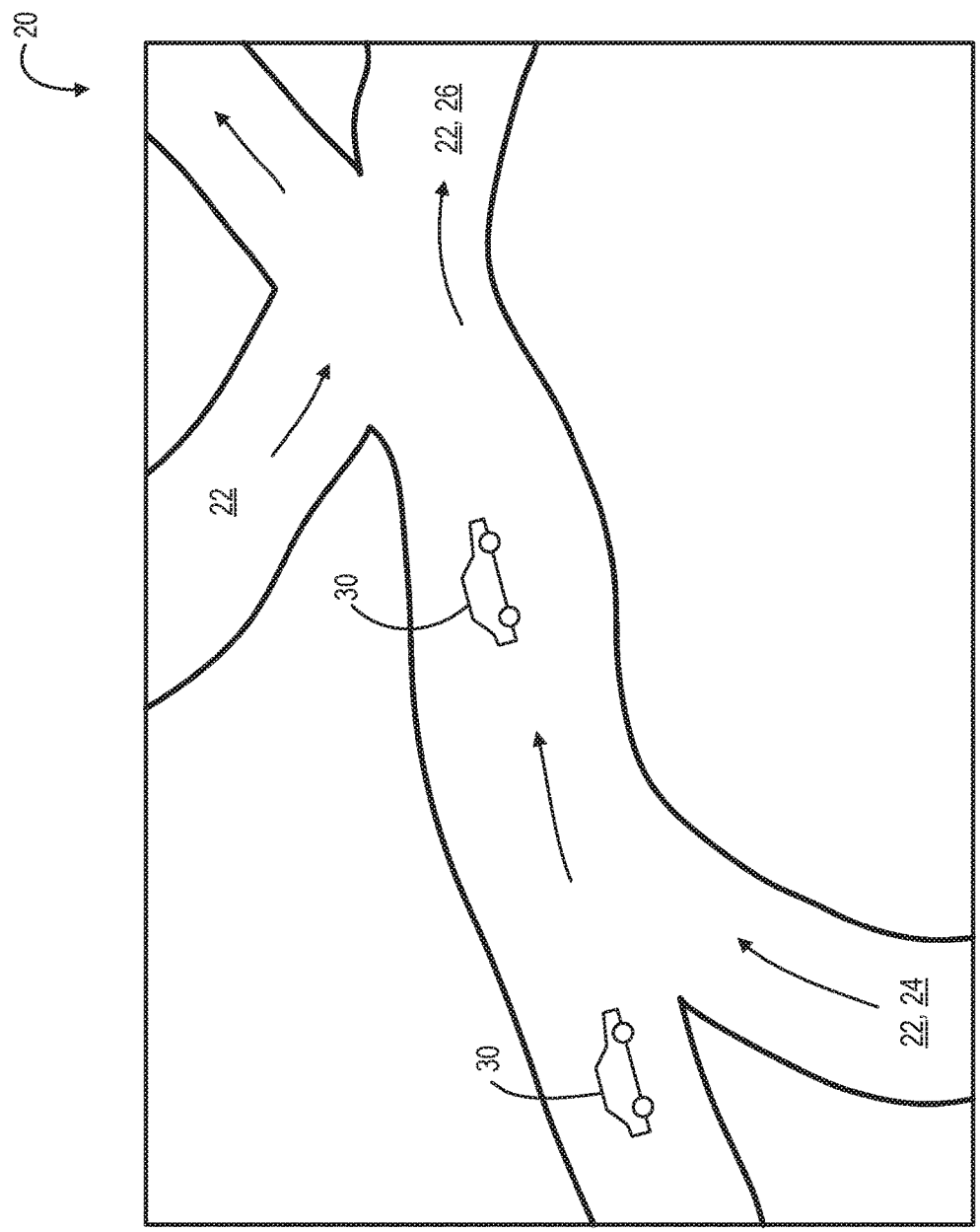
FIG. 1 shows an example of a pathway for vehicles.

The drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings may be understood to be to scale and in proportion unless otherwise noted. The wording used herein is intended to include both singular and plural where such would be understood, and to include synonyms or analogous terminology to the terminology used, and to include equivalents thereof in English or in any language into which this specification may be translated, without being limited to specific words or phrases.

Referring to FIG. 1, and by way of a general overview, there is a pathway for vehicles, indicated generically as 20. The pathway for vehicles may be, or may be called, a road, a highway, a freeway, a carriageway, a dual-carriageway, an autobahn, an autoroute, or a track, or such other synonym as may be. The pathway may be a single lane, a double lane, or more than two lanes. The pathway has a set of access points 22 which includes at least one entrance location 24 and at least one exit locations 26 at which a vehicle 30 may enter or leave the pathway. Typically, there may be many entrance and exit locations. In some cases, an access point 22 may be both an entrance location and an exit location. The vehicle may enter the pathway at any entrance, and may exit the pathway at any exit. That is, the vehicle may travel along the entire length of the pathway, or along only some portion thereof.

For the purpose of this discussion, the pathway is a monitored pathway. That is, whether pathway 20 is linked to unmonitored pathways at beginning or end or both, the pathway of interest is one on which the presence of vehicle 30 is to be determined. For example, pathway 20 may be, or may include, a toll road, or a bridge, or a tunnel, or a segregated vehicle lane for only certain types of vehicles, or for only vehicles having certain attributes. One such attribute is an assessment of vehicle occupancy, whether for the purposes of compliance with a regulatory regime of limited access to pathway 20, or for the purpose of assessing tolling charges.

Figure 2A:
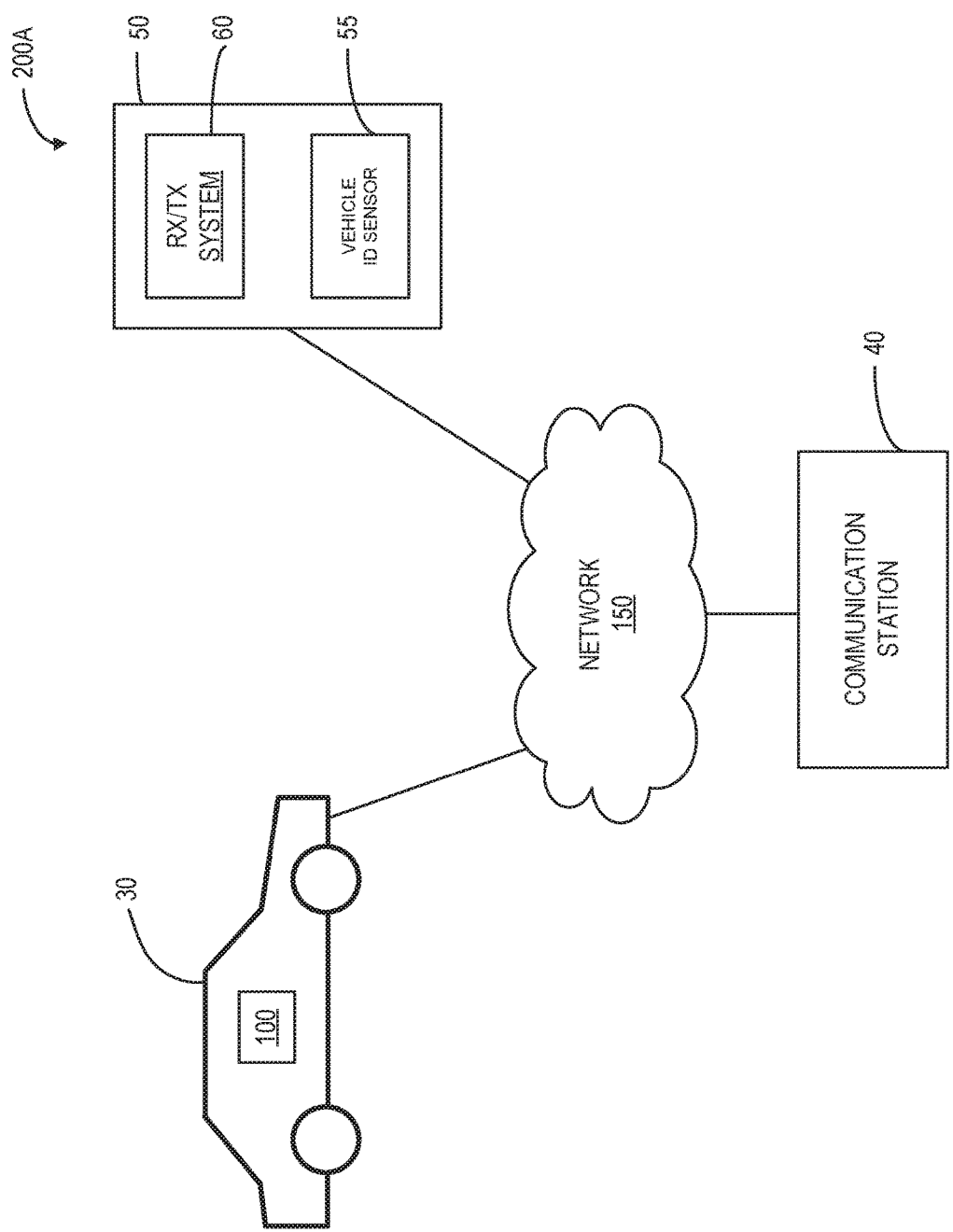
FIG. 2A is an example of a block diagram of a vehicle occupancy monitor assembly.

Reference is next made to FIG. 2A, which illustrates a block diagram of a vehicle occupancy monitor assembly 200A in accordance with an example. The vehicle occupancy monitor assembly 200A includes a vehicle occupancy detection system 100, a communication station 40, a vehicle identification system 50 and a network 150.

Vehicle occupancy detection system 100 is provided within vehicle 30, and is responsible for determining the number of occupants in a vehicle travelling on pathway 20. As discussed in detail below, the vehicle occupancy detection system monitors and analyzes various characteristics of the vehicle when the vehicle is in use. For example, vehicle occupancy detection system 100 obtains information from a number of on-board sensors to estimate the number of occupants in the vehicle.

In one embodiment, an in-vehicle transponder interacts with the on-board diagnosis system of the vehicle (OBD-II). The OBD-II provides access to data, such as, real-time performance data, sensory information from the Engine Control Unit (ECU), engine RPM, vehicle speed, throttle position, engine load, fuel rate, etc. The information collected from the OBD-II is analyzed by the in-vehicle transponder to detect a variation in the mass of the vehicle as a result of a change in the number of occupants in the vehicle. In some cases, the in-vehicle transponder additionally uses on-board GPS and accelerometer sensor data to refine the vehicle occupancy data. In one example, the in-vehicle transponder may alternatively or additionally use passenger seat pressure data and seat-belt sensor data to aid in making the vehicle occupancy determination. In another example, the in-vehicle transponder can alternatively or additionally use in-vehicle WiFi and Bluetooth device data to assist in the determination of the number of occupants in the vehicle.

In some cases, the systems and methods described herein involve connecting the in-vehicle transponder to a mobile (or electronic communication) device of one of the occupants of the vehicle, such as, for example, the driver of the vehicle. The in-vehicle transponder transmits the estimated number of occupants to the mobile device for confirmation before reporting it to an external server, such as, for example, a road-side transceiver. In some other cases, the estimated number of occupants determined by the in-vehicle transponder is displayed on the transponder itself, and can be updated by the driver or another occupant of the vehicle by interacting with the transponder, such as by tapping on the transponder or keying in information either orally or by touch.

The occupant receiving the estimated occupancy data on his or her mobile device is expected to update the number of occupants if the estimated number displayed by the in-vehicle transponder is incorrect. In some cases, the estimated number of occupants is transmitted to a graphical user interface on the windshield, rear-view-mirror or the dashboard of the vehicle instead of the occupant's mobile device. In such cases, the driver or the front-seat passenger can update the estimated number of occupants if needed.

For the purposes of discussion, there is a presumption of the existence of an external communication station 40. Communication station 40 may be remote from pathway 20. Communications station 40 may be the communications center, or headquarters, of a transport authority responsible for monitoring compliance with a set of rules governing pathway 20, and of the use of pathway 20, or it may be a tolling authority, fee assessment and billing authority, or both.

As a pre-requisite for the determination of compliance with an operational regime, and prior to a determination of particular attributes of vehicle 30, a threshold determination is whether vehicle 30 is located in the region or area, or space, defined by monitored pathway 20. That is, if vehicle 30 is not on pathway 20, then there is nothing to monitor.

The presence of vehicle 30 on pathway 20 may be determined in several ways. In one example, a location sensor, such as a GPS sensor, positioned within the vehicle 30 can be used to detect the presence of the vehicle 30 on the pathway 20. When the location sensor indicates that the vehicle 30 is on the pathway 20, other steps follow. For example, if the vehicle 30 is determined to be on the pathway 20, the vehicle occupancy detection system 100 is triggered to determine the occupancy rate of the vehicle 30.

The vehicle identification system 50 is provided on the pathway 20, and is responsible for identifying the vehicle 30 as it drives on the pathway 20 and when it is in the general vicinity of the vehicle identification system 50. In general, each vehicle 20 can be identified by a uniquely associated vehicle identifier. Some non-limiting examples of vehicle identifiers can include vehicle identification number (VIN), vehicle license plate number, vehicle ownership information etc.

Figure 2C:
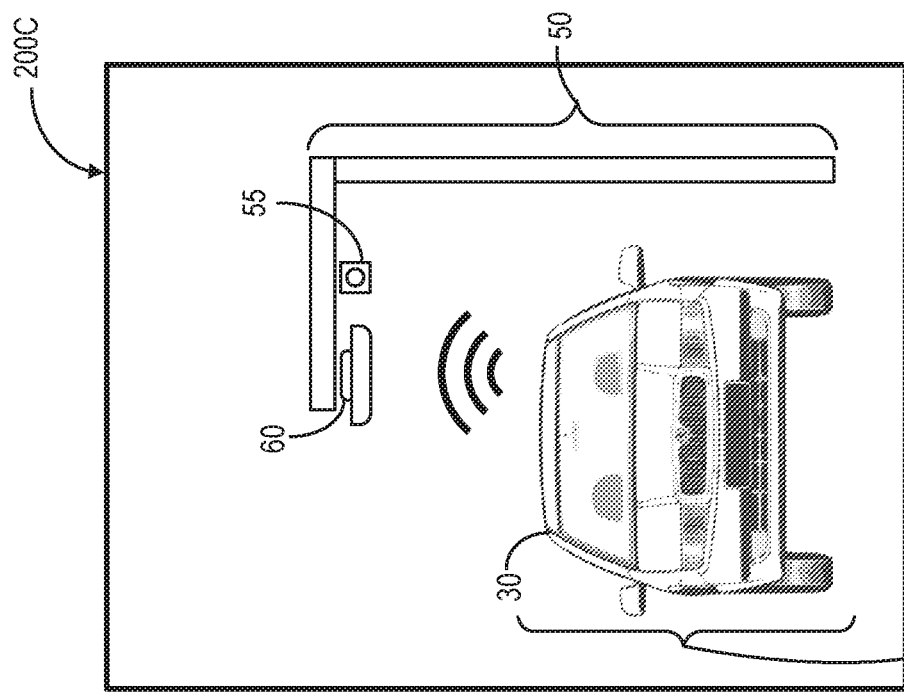
FIG. 2C is another example of a vehicle occupancy monitor assembly.
Figure 2B:
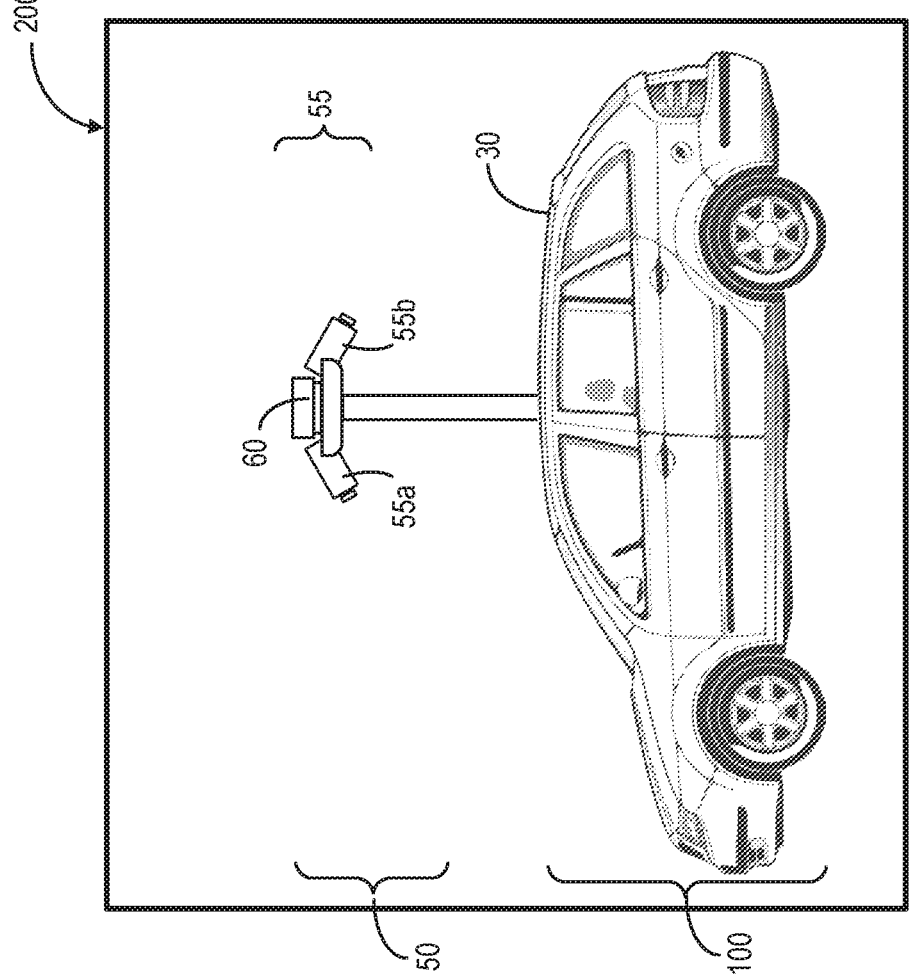
FIG. 2B is another example of a vehicle occupancy monitor assembly.

In the illustrated embodiment, the vehicle identification system 50 includes a vehicle identification sensor 55 that identifies the vehicle 30 in a suitable manner. In one example, the vehicle identification sensor 55 includes an image-capturing device, such as, for example, a camera. In this example, the image-capturing device may be an automatic license plate recognition system (ALPR) capable of detecting the license plate number associated with the vehicle 30. In some cases, as illustrated in FIG. 2B, the vehicle identification sensor 55 includes a back camera 55a and a front camera 55b to capture the front and back views of the vehicle 30. The front and the back views can then be processed to determine the license plate number of the vehicle 30. In some other case, as illustrated in FIG. 3C, the vehicle identification sensor 55 includes one camera that is capable of capturing the license plate number of the vehicle either from the front or the back of the vehicle.

In another example, the vehicle identification sensor 55 includes a radio-frequency identification (RFID) reader. The RFID reader is operable to receive vehicle identifier transmitted by an RFID tag in the vehicle 30. The RFID tag may transmit the vehicle identifier at a predetermined frequency, or when polled by the RFID reader. Some other non-limiting examples of the vehicle identification sensor 55 can include a barcode reader, a radar, a microphone, a laser scanner, etc.

The vehicle identification system 50 also includes a transceiver system 60 that is configured to communicate with the vehicle 30, and with the vehicle occupancy detection system 100 in particular, via the network 150. The transceiver system 60 includes a dedicated short range communications receiver that facilitates communication with the vehicle occupancy detection system 100 when vehicle 30 is in the vicinity of the transceiver system 60.

In some cases, the communication station 40 receives vehicle occupancy data from various vehicles 30 running on the pathway 20, and determines rules regarding a real-time dynamic tolling scheme to be implemented on the pathway 20 based on current traffic patterns or uses. Communication station 40 may receive the vehicle occupancy data from occupancy detection system 100 or from vehicle identification system 50, or both.

In some cases, vehicle occupancy monitor assembly 200A can be used to implement a dynamic tolling scheme by identifying those vehicles that are improperly using transponders or misrepresenting the number of occupants in the vehicle. For example, if occupancy detection system 100 determines that the number of occupants detected by system 100 has been updated or varied by an occupant of vehicle 30, system 100 can transmit an alert to communication station 40 or vehicle identification system 50. Vehicle identification system 50 can then determine the vehicle identifier associated with vehicle 30, transmit the alert, and transmit the vehicle identifier, along with other parameters, e.g., the time and or location, or both, of that specific vehicle 30, to a nearby enforcement officer, who can then verify the reported occupancy rate of vehicle 30 and issue an infraction if occupancy rate is found to be misrepresented.

Figure 3A:
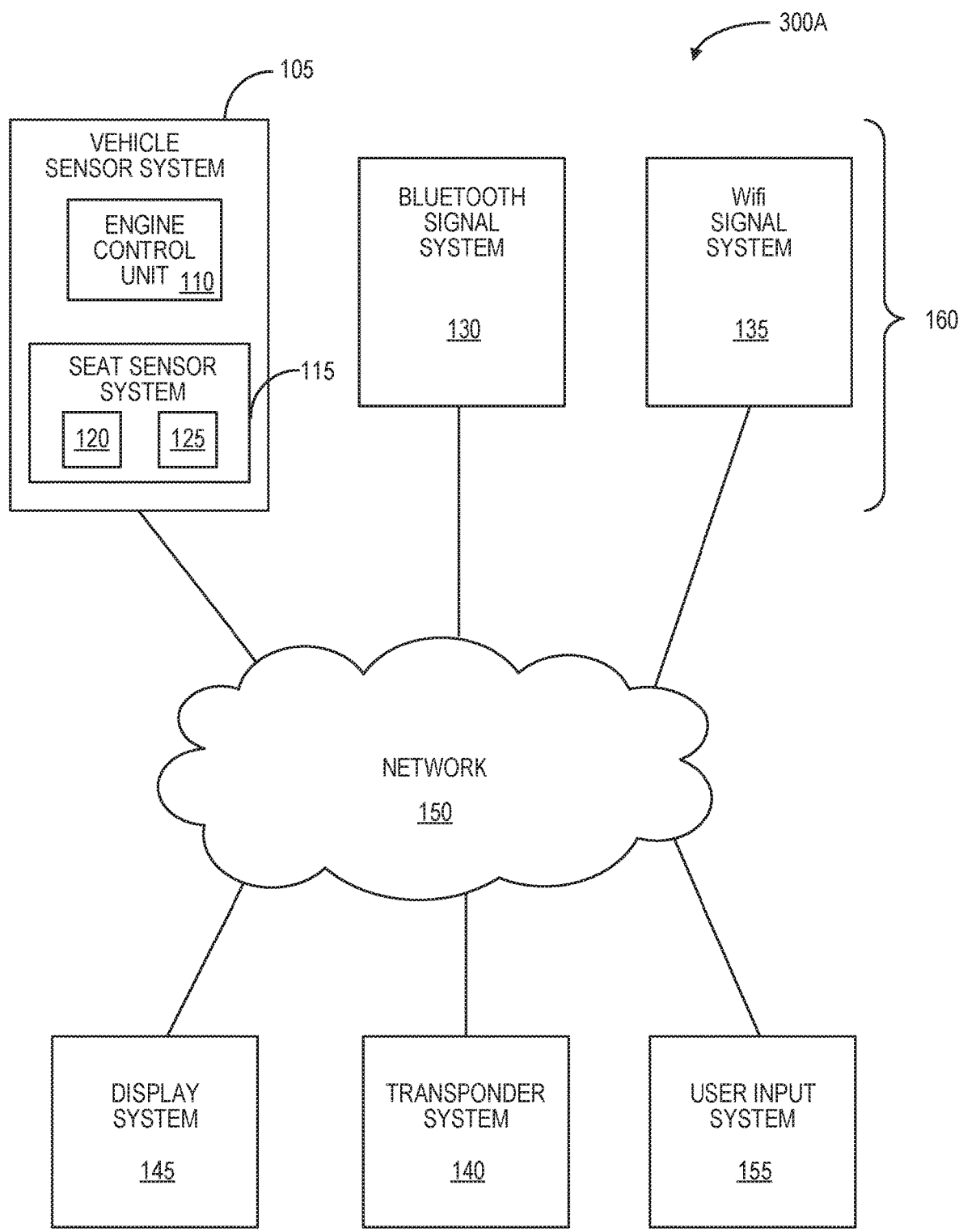
FIG. 3A is an example of a block diagram of a vehicle occupancy detection system.

FIG. 3A illustrates a block diagram of a vehicle occupancy detection system 300A in accordance with an example. System 300A is an example. There can be other embodiments of system 300A with different components or a different configuration of the components described herein. System 300A is analogous to system 100 discussed above with respect to FIGS. 2A-2C.

As illustrated, system 300A includes a plurality of data sources 160, a transponder system 140, a display system 145, a user input system 155, and network 150. Data sources 160 include devices or systems that provide information related to vehicle performance as well as sensory information that can be used to determine the occupancy rate of the vehicle.

Transponder system 140 is any networked computing device that includes a processor and memory. The memory of transponder system 140 is configured to store instructions executable by the processor. Transponder system 140 is configured to receive data signals from various data sources 160 of system 300A. Transponder system 140 analyzes the received data and determines an estimated vehicle occupancy rate reflecting an estimate of the number of occupants in the vehicle.

Data sources 160 and transponder system 140 communicate with each other via network 150. Network 150 is any wired or wireless system capable of carrying data between two or more devices or systems. Some non-limiting examples of network 150 include the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, a storage medium, such as, for example, a CD ROM, a DVD, an SD card, an external hard drive, a USB drive, etc.

In FIG. 3A, system 300A also includes a display system 145 and a user input system 155. In some cases, display system 145 and user input system 155 are combined into a single system. In some other cases, display system 145 and user input system 155 form part of transponder system 140.

In some cases, display system 145 is separate from transponder system 140. For example, display system 145 is a mobile device of the driver or the front seat passenger of the vehicle, if applicable. In another example, display system 145 is a display screen located at the dashboard of the vehicle. In a further example, display system 145 is a display screen located at the windshield of the vehicle. In some cases, system 300A is provided with a voice activated system that announces the information that would otherwise be displayed by display system 145.

In cases where display system 145 is separate from transponder system 140, display system 145 is configured to receive from transponder system 140 a signal (the 'estimated occupancy rate signal') including the estimated vehicle occupancy rate as determined by transponder system 140. The estimated occupancy rate signal is communicated from transponder system 140 to display system 145 via network 150.

Display system 145 is configured to display the estimated occupancy rate of the vehicle for verification by an occupant of the vehicle. An occupant of the vehicle, for example, the driver or the front seat passenger, can review the displayed estimated occupancy rate of the vehicle and update it, if necessary, using user input system 156.

User input system 156 is an input device or devices configured to receive instructions from a user, such as an occupant of the vehicle. As discussed above, user input system 156 may be a part of display system 145, transponder system 140 or a stand-alone device. User input system 156 is used by an occupant of the vehicle to provide an input that can be used to update the estimated occupancy rate of the vehicle. For example, if the estimated occupancy rate of the vehicle displayed in display system 145 is incorrect in that it doesn't accurately capture the number of occupants in the vehicle, user input system 156 can be used by the occupant to update the vehicle occupancy rate to reflect the correct number of occupants in the vehicle.

User input system 156 can provide any user interface that can be used to provide a number. Some non-limiting examples of user input system 156 include a hard or soft numerical key pad, a touchscreen displaying selectable buttons representing a range of numbers, a dial or a scroller that can be manipulated to select the correct number of occupants, etc.

Once the estimated occupancy rate of the vehicle is updated by an occupant of the vehicle, the updated occupancy rate is recorded by transponder system 140. Transponder system 140 is further configured to transmit a signal including the updated occupancy rate to an external server, such as a tolling system, a road-side transceiver, etc., where the occupancy rate of the vehicle can be used to determine a toll amount for the vehicle, a penalty for the vehicle, etc.

In FIG. 3A, one of data sources 160 includes a vehicle sensor system 105. Vehicle sensor system 105 refers to one or more data sources that are provided within the vehicle. For example, in some cases, vehicle sensor system 105 is installed in the vehicle during manufacturing of the vehicle. In some other cases, vehicle sensor system 105 is installed in the vehicle after the vehicle has been in use for a few months or years, etc. Data sources 160 also include other sources, such as electronic devices, that are brought into the vehicle by the occupants of the vehicle.

Figure 3B:
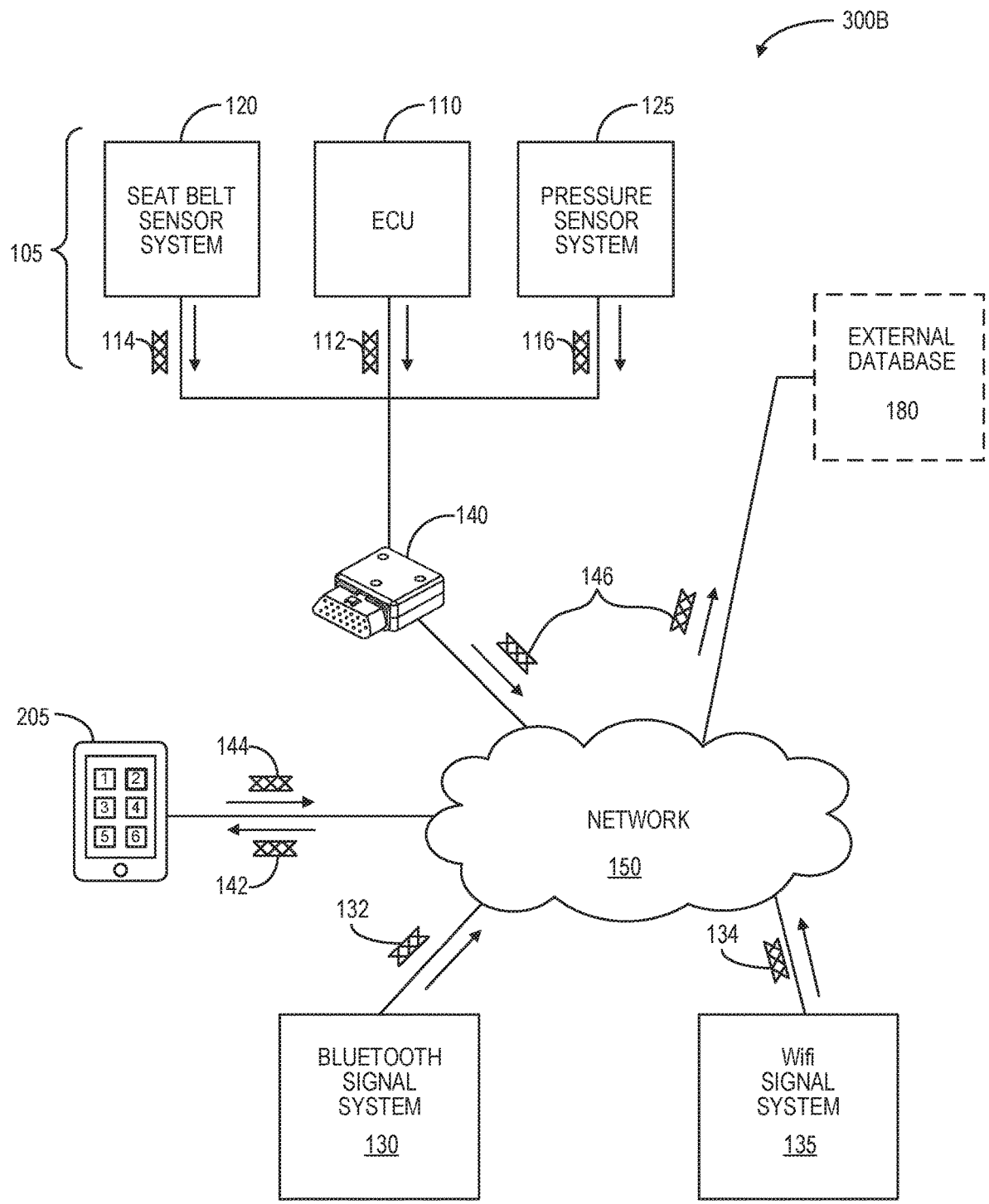
FIG. 3B is another example of a block diagram of a vehicle occupancy detection system.

The various data sources 160 shown in FIG. 3A are discussed in detail below with simultaneous reference to FIG. 3B. FIG. 3B illustrates a block diagram of a vehicle occupancy detection system 300B in accordance with another example embodiment. System 300B is provided as an example. There can be other embodiments of system 300B with different components or a different configuration of the components described herein. System 300B is analogous to system 300A, and illustrates an exchange of information signals between various components of a vehicle occupancy detection system, such as system 300A and system 300B. As well, in the embodiment of FIG. 3B, the vehicle sensor system 105 is shown to be connected to transponder system 140 via a wired connection, and other data sources, such as Bluetooth and WiFi signal systems are connected to transponder system 140 via a wireless connection.

In FIG. 3A, vehicle sensor system 105 includes an engine control unit (ECU) 110 configured to monitor one or more operating parameters of the engine of the vehicle. Some non-limiting examples of engine parameters that can be monitored by the ECU 110 include odometer information, engine speed, fuel consumption, fuel rate, mass air pressure, mass air flow, mileage, distance, fuel rate, inlet air temperature, engine instantaneous fuel economy, engine average fuel economy, engine inlet air mass flow rate, engine demand percent torque, engine percent load at current speed, transmission actual gear ratio, transmission current gear, engine cylinder combustion status, engine cylinder knock level, drivetrain information, vehicle speed and GPS location, etc.

In at least one embodiment, the ECU 110 monitors vehicle operating parameters including vehicle speed, commanded throttle, engine load and engine rotational speed (RPM). Measurements corresponding to such vehicle operating parameters monitored by the ECU 110 are provided to transponder system 140 via a wired connection with the on-board diagnosis system of the vehicle (OBD-II).

As illustrated in FIG. 3B, the various engine operating parameters monitored by the ECU 110 and corresponding measurements are transmitted to transponder system 140 as ECU engine status signal 112. The ECU engine status signal 112 may be provided to transponder system 140 at a predetermined frequency, or at a request of transponder system 140. The ECU engine status signal 112 may be a multiplexed signal. In some cases, each engine operating parameter and corresponding measurement is transmitted to the ECU 110 as individual signals.

In some embodiments disclosed herein, transponder system 140 is also equipped with sensors to detect certain operating parameters of the vehicle. For example, in some cases, transponder system 140 includes a GPS sensor 165 configured to determine the location of the vehicle. In some other cases, transponder system 140 includes an accelerometer 170 to determine the acceleration of the vehicle. The accelerometer can be additionally used to determine the inclination of the vehicle on a slope, as discussed below.

Transponder system 140 is configured to receive the engine operating parameters and corresponding measurements from the ECU 110. In some cases, where transponder system 140 is not equipped with a sensor, such as an accelerometer, transponder system 140 is configured to determine vehicle acceleration information based on the speed of the vehicle detected by the ECU 110. The acceleration measurement may alternatively be monitored or generated by the ECU 110 and transmitted to transponder system 140. However, in cases where transponder system 140 is equipped with an accelerometer, transponder system 140 may rely on the accelerometer to determine the acceleration of the vehicle. Transponder system 140 is next configured to determine the mass of the vehicle.

In at least one embodiment, transponder system 140 is configured to determine the vehicle mass based on acceleration, throttle command and engine load measurements. Since these measurements vary with the changes in a moving vehicle's linear speed and rotational speed (engine RPM), transponder system 140 is configured to determine the mass measurement for the vehicle for different gear levels of the vehicle. In many cases, transponder system 140 determines the gear levels of the vehicle by determining and categorizing the ratio of engine RPM and vehicle speed.

In some cases, the vehicle mass is only determined for higher gear levels, such as gear level 3 and above. This is because in lower gear levels, the vehicle dynamics vary greatly, and the vehicle mass calculated at those gear levels may not reflect the mass of the vehicle accurately.

In some cases, transponder system 140 is configured to adjust the determined vehicle mass based on predetermined vehicle masses for similar range of engine load and acceleration. The predetermined vehicle masses may be experimental data stored in the memory of transponder system 140 in the form of, for example, a look-up table.

In some cases, transponder system 140 uses the accelerometer data to determine the inclination of the vehicle on a slope, and uses the inclination data to refine the vehicle mass determination. In order to minimize errors, transponder system 140 may be configured to eliminate those engine operating parameters from the vehicle mass calculation that were monitored by the ECU 110, transponder system 140, or both, when the vehicle was moving on the roads with a predetermined slope.

In some embodiments, the vehicle mass (m) is determined by transponder system 140 based on the following equation (1):

$$m = k\frac{T_e}{a}, \qquad (1)$$

where:

$$k = \frac{60 X_t X_d n}{9.5463 * 2\pi R}$$

$T_e$=f(throttle position, $RPM_e$)
a=acceleration of the car*m/s$^2$)
$RPM_e$=RPM of the engine
$X_t$=transmission gear ratio of the car (value varies based on the instant gear)
$X_d$=final differential gear ratio of the car (fixed value for a given car)
n=efficiency of drive train system (approximately 70%)
R=radius of the wheel.

Referring back to FIG. 3A, vehicle sensor system 105 also includes a seat sensor system 115. Seat sensor system 115 includes one or more sensors used to determine if a vehicle seat is being occupied by a passenger. The seat sensor system 115 includes seat belt sensors 120, each associated with a unique vehicle seat. In most cases, vehicle sensor system 105 has at least two seat belt sensors 120, one associated with the driver seat and the other associated with the front seat passenger. In some other cases, seat sensor system 115 may include additional seat belt sensors 120, each associated with a unique back seat.

Seat belt sensors 120 monitor whether or not the corresponding seat belts are engaged by the occupants of the vehicle. A seat belt sensor 120 is triggered as soon as a corresponding passenger occupies the seat and buckles the seat belt. Seat belt sensors 120 communicate a seat belt sensor signal 114 to transponder system 140, where the seat belt sensor signal 114 identifies how many seat belts in the vehicle are engaged. In some cases, the seat belt sensor signal 114 also identifies the location of the engaged seat belts.

In FIG. 3A, seat sensor system 115 also has load or pressure sensors 125, where one or more seats of the vehicle are equipped with a corresponding load or pressure sensor 125. A load or pressure sensor 125 monitors the presence of absence of passengers on a seat based on the load or pressure exerted on seat. As illustrated in FIG. 3B, sensors 125 communicate a pressure sensor signal 116 to transponder system 140, where the pressure sensor signal 116 identifies how many pressure sensors in the vehicle are engaged. In some cases, the pressure sensor signal 116 also identifies the location of the occupied seats.

Transponder system 140 receives the seat belt sensor signal 114 and determines the number of occupants in the vehicle based on the seat belt sensor signal 114. In some other cases, transponder system 140 receives pressure sensor signal 116 and determines the number of occupants in the vehicle based on pressure sensor signal 116.

In various cases, transponder system 140 determines the number of occupants in the vehicle based on both the seat belt sensor signal 114 and the pressure sensor signal 116. In such cases, a vehicle seat is determined to be occupied only if both the seat belt sensor and the pressure sensor for a corresponding seat are determined to be engaged by transponder system 140.

In most cases, seat belt sensor signal 114 and the pressure sensor signal 116 are transmitted to transponder system 140 via a wired connection with the on-board diagnosis system of the vehicle (such as, via the OBD-II port), as shown in FIG. 3B.

Referring back to FIG. 3A, data sources 160 also include a Bluetooth signal system 130. Bluetooth signal system 130 includes electronic devices that are able to pair with the vehicle using Bluetooth connection. For example, the passengers occupying the vehicle may have mobile devices that can be connected to the vehicle via a Bluetooth connection. In such cases, transponder system 140 uses Bluetooth signals 132 received from Bluetooth signal system 130 to ascertain the number of occupants in the vehicles.

When the Bluetooth devices, such as electronic devices of the passengers of the vehicles, are in proximity to transponder system 140 and paired to the vehicle, transponder system 140 detects the Bluetooth signals and determines the number of occupants in a vehicle based on the Bluetooth signals.

In some cases, the paired Bluetooth devices in neighboring vehicles may also be detected by transponder system 140. To avoid false positives, transponder system 140 is configured to analyze signal strengths of the incoming Bluetooth signals and determine whether the Bluetooth signals are being received from local devices (i.e. within the vehicle) or remote devices (i.e. outside the vehicle). For example, in some cases, transponder system 140 may be configured to compare the signal strengths of incoming Bluetooth signals to a predetermined threshold. The predetermined threshold may be based on historical data, and may vary from one vehicle to another.

In some cases, the threshold used by transponder system 140 is a global threshold that is used in all circumstances to filter out Bluetooth signals that are incoming from remote devices. In some other cases, the threshold used by transponder system 140 is a device specific threshold. In such cases, transponder system 140 first identifies the type of device transmitting Bluetooth signals received by transponder system 140. Next, transponder system 140 filters out Bluetooth signals being received from remote devices based on the device specific threshold suitable for the identified device. In the latter case, the threshold used by transponder system 140 is different from one Bluetooth device to another.

In some cases, transponder system 140 uses an auto-adjustment algorithm to adjust the filtering threshold for various kinds of vehicles, various kinds of Bluetooth devices, or a combination, to filter out remote devices. Transponder system 140 may adjust the thresholds based on distribution of historical signal strength data.

In some cases, multiple devices may be used by the same passenger in a vehicle. In such cases, the transponder uses a clustering algorithm to match the declared occupants of the vehicle with the identified devices. For example, transponder system 140 is configured to use historical data to cluster Bluetooth devices together and associate them with one occupant. For instance, if on a previous occasion, only one occupant (i.e. the driver) was identified by transponder system 140 and confirmed by the driver, the Bluetooth devices identified on that occasion are concluded as being associated with the driver. This information is then saved in the memory of the transponder system for future use.

As illustrated in FIG. 3A, data sources 160 further include a WiFi signal system 135. WiFi signal system 135 includes electronic devices that are able to emit WiFi packets. For example, the passengers occupying the vehicle may have mobile devices that emit periodic WiFi packets. In most cases, the emitted WiFi signals include a unique MAC address corresponding to the type of mobile device emitting the WiFi packets. In some other cases, the emitted WiFi signals include another type of signature in the packet header representing the type of mobile device emitting the WiFi packets. Transponder system 140 is configured to analyze incoming WiFi signals 134 received from WiFi signal system 135 to ascertain the number of occupants in the vehicles. Transponder system 140 is configured to analyze signals based on the unique MAC addresses or the unique signatures.

Transponder system 140 is configured to detect incoming WiFi signals from local and remote devices, and filter them based on corresponding signal strengths. For example, transponder system 140 may be configured to compare the signal strength of the incoming WiFi packets to a predetermined threshold strength, and filter out WiFi packets that do not have a signal strength greater than or equal to the threshold strength. The threshold strength can be a global threshold or a device specific threshold, and can be determined based on historical data. In some cases, the global or device-specific threshold is adjusted based on the distribution of the historical signal strength data.

The interval between two consecutive WiFi packets may vary from one device to another. In addition, the interval between two consecutive WiFi packets received from the same device may also vary over time. In some cases, the interval may be as long as 2-3 minutes. In such cases, transponder system 140 is first configured to detect at least two consecutive WiFi packets received from a same device. Transponder system 140 may detect the source of the WiFi packets based on the unique MAC address or other unique signature provided in each packet. Next, transponder system 140 is configured to compare the signal strengths of the detected consecutive WiFi packets to a predetermined threshold, and accordingly determine if the WiFi emitting device is inside the vehicle or outside. As discussed above, transponder system 140 is also configured to use a clustering algorithm to use historical data to cluster multiple WiFi devices together and associate them with one occupant.

Figure 7:
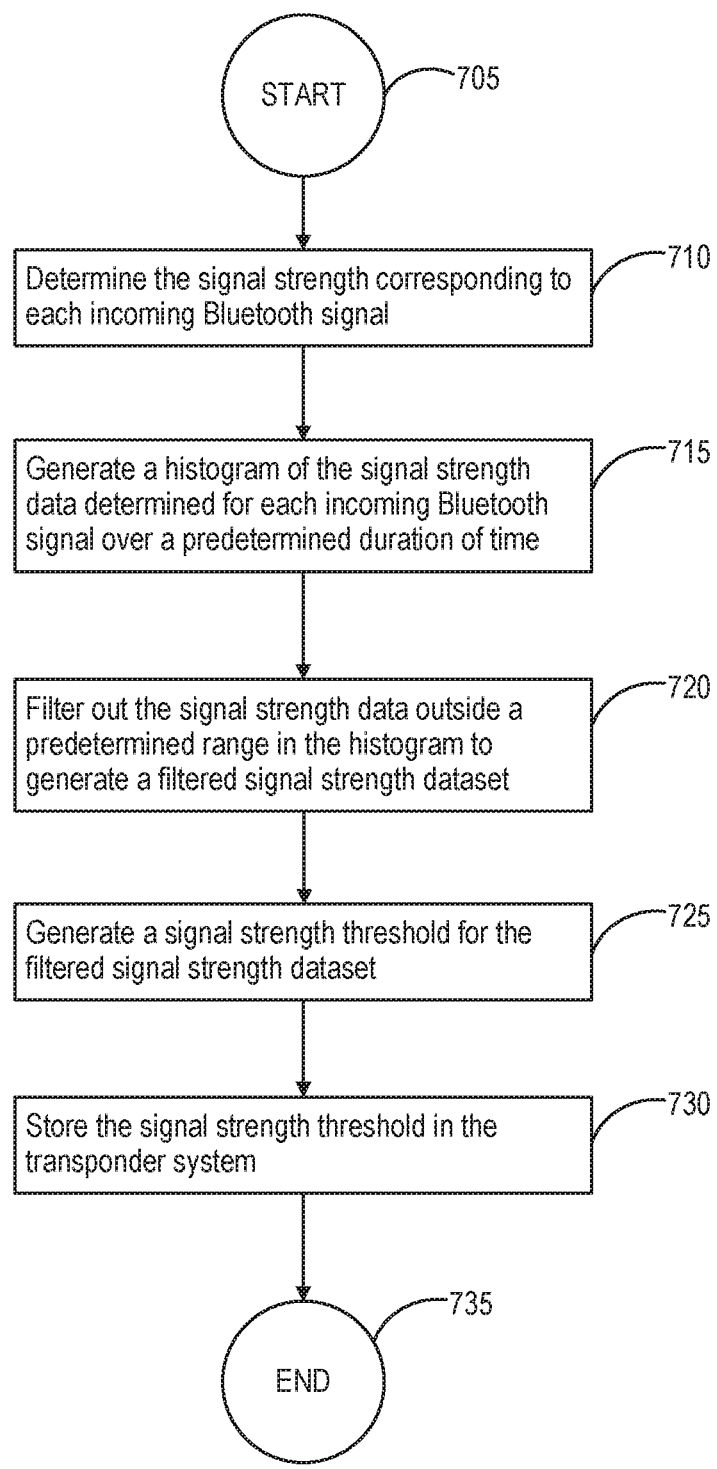
FIG. 7 is an example of a process of determining a signal strength threshold.

In FIG. 7, which illustrates an example embodiment of a signal strength analysis method 700 in accordance with the teachings herein. The method 700 is carried out by a transponder system, such as transponder system 140 of FIGS. 3A and 3B. In one embodiment, the transponder system is configured to use method 700 to determine a signal strength threshold, which is used to determine whether the Bluetooth emitting devices are located within the same vehicle as the transponder system, or outside the vehicle. The method 700 of FIG. 7 may analogously be used to determine whether the WiFi emitting devices are located within the same vehicle as the transponder system, or outside the vehicle.

The method begins at 705. At 710, the signal strength data corresponding to each incoming Bluetooth signal is determined by the transponder system. The Bluetooth signals may be received from one or more Bluetooth emitting devices, such as mobile phones, smart watches, digital headsets etc. The transponder system may receive Bluetooth signals from devices that may or may not be inside the same vehicle as the transponder system. For example, the transponder system of one vehicle may receive Bluetooth signals from the transponder system of a nearby neighboring vehicle. If left unaddressed, this may skew the occupancy rate determination by the transponder system.

At 715, the transponder system is configured to generate a histogram (e.g. a bar graph etc.) of the signal strength data determined for each received Bluetooth signal over a predetermined duration of time. For example, the transponder system may be configured to generate the histogram of the signal strength data every time the vehicle commences use. In another example, the transponder system may be configured to generate the histogram of the signal strength data every time the vehicle stops and starts. In yet another example, the transponder system may be configured to generate the histogram of the signal strength data after a predetermined number of signal strength data points are acquired by the transponder system.

At 720, the signal strength data that is outside a predetermined range is filtered out to generate a filtered signal strength dataset. The predetermined range may identify an upper threshold and a lower threshold of acceptable signal strength data, where the acceptable signal strength data may be indicative of signal strengths corresponding to Bluetooth devices located within the same vehicle as the transponder system based on historical data.

At 725, the transponder system is configured to generate a signal strength threshold for the filtered signal strength dataset. In one example, the signal strength threshold is generated by the transponder system based on the local minima determination of the signal strength data distribution. In this example, the transponder system may be configured to map a polynomial curve over the histogram generated at 610, and calculate the local minima of the curve. The transponder system may be next configured to determine a signal strength threshold to include a predetermined percentage of the filtered signal strength dataset larger than one or more local minima.

In some cases, the predetermined percentage is based on historical data. In some other cases, the predetermined percentage is based on the speed of the vehicle. For example, at a speed larger than 10 Km/h, the predetermined percentage may be 90%, such that the 90% percentile is used to compute the signal strength threshold. In another example, for vehicle speed between 5-10 Km/h, the predetermined percentage may be 85%.

At 730, the signal strength threshold is saved in the transponder system. The saved signal strength threshold is used to determine whether or not the subsequent incoming Bluetooth signals are within the vehicle or outside the vehicle when the vehicle is in use. For example, the transponder system will disregard an incoming Bluetooth signal if the signal strength is determined to be lower than the signal strength threshold determined at 730. The method ends at 735.

In FIG. 3A, transponder system 140 may also be configured to determine the signal strength threshold per device based on the method 700 of FIG. 7. In order to determine the signal strength threshold per device, transponder system 140 carries out steps 715-725 of FIG. 7 for signal strength data determined for Bluetooth signals received from the same Bluetooth emitting device. Transponder system 140 may be configured to determine the source of the incoming Bluetooth signal based on a unique signature or identifier in the incoming Bluetooth signals.

As illustrated in FIG. 3B, transponder system 140 is configured to receive ECU engine status signal 112, seat belt sensor signal 114, pressure sensor signal 116, Bluetooth signals 132 and WiFi signals 134 from various data sources 160 and determine the vehicle occupancy rate based on the measurements and sensory data contained in these signals.

In the various embodiments illustrated herein, various signals received from the data sources 160 contain various states. For example, the seat belt sensor signal 114 may contain two states corresponding to the front passenger seat belt (FPSB). The two states include an ony state representing that the seat belt for the front passenger is engaged and an 'off' state representing that the seat belt for the front passenger is not engaged. In another example, the Bluetooth signals 132 received from the Bluetooth signal system 130 are processed by transponder system 140 to generate three states, a first state indicating one connected device, a second state indicating two connected devices and a third state indicating three or more connected devices.

In another example, WiFi signals 134 received from WiFi signal system 135 can be processed by transponder system 140 to generate three states, a first state indicating one connected device, a second state indicating two connected devices and a third state indicating three or more connected devices.

In a further example, transponder system 140 is configured to process the ECU engine status signal 112 and to generate three states indicating the mass of the vehicle, where the first state indicates that the vehicle mass is less than a first threshold, a second state indicates that the vehicle mass is between the first threshold and a second threshold, and a third state indicates that the vehicle mass is greater than the second threshold. In some cases, the first threshold is the base mass plus 40 kg (where base mass represents the mass of the vehicle and the driver) and the second threshold is base mass plus 100 kg. In some other cases, the first and the second thresholds can be different values.

Figure 4:
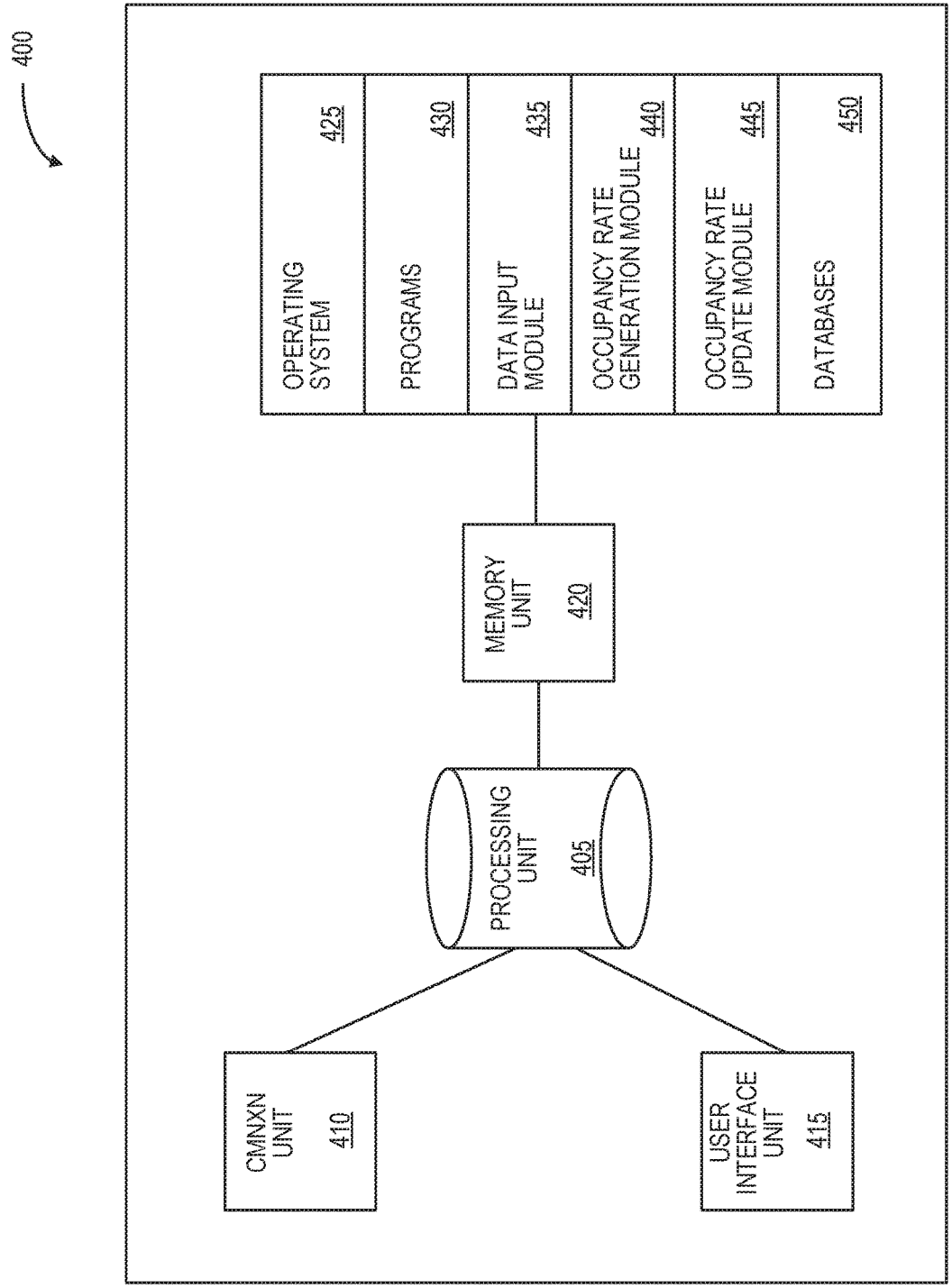
FIG. 4 is an example of a block diagram of a transponder system.

In some cases, in order to determine the vehicle occupancy rate, transponder system 140 is configured to generate a weighted decision making tree based on the states of the various parameters received from data sources 160. Non-limiting examples of weighted decision making trees used by transponder system 140 are illustrated in FIGS. 3 and 4 below.

As illustrated in FIG. 3B, the estimated occupancy rate determined by the transponder system is transmitted to a display system, such as display system 145 of FIG. 3A via an estimated occupancy rate signal 142. The display system can be a mobile device 205 of the driver. In FIG. 3B, the driver of the vehicle receives the estimated occupancy rate of the vehicle and updates it if necessary. The updated vehicle occupancy rate is transmitted from display system 205 to transponder system 140 via a final vehicle occupancy rate signal 144.

In some cases, transponder system 140 is then configured to transmit the final vehicle occupancy rate to an external database 180. The external database can any server or combination of servers that is coupled to system 100 via network 150. The external database can include a communication station, such as the communication station 40 of FIG. 2A, or a vehicle identification system, such as the vehicle identification system 50 of FIG. 2A, or both. The vehicle occupancy rate is transmitted to the external database 180 via a transmit signal 146.

Figure 5:
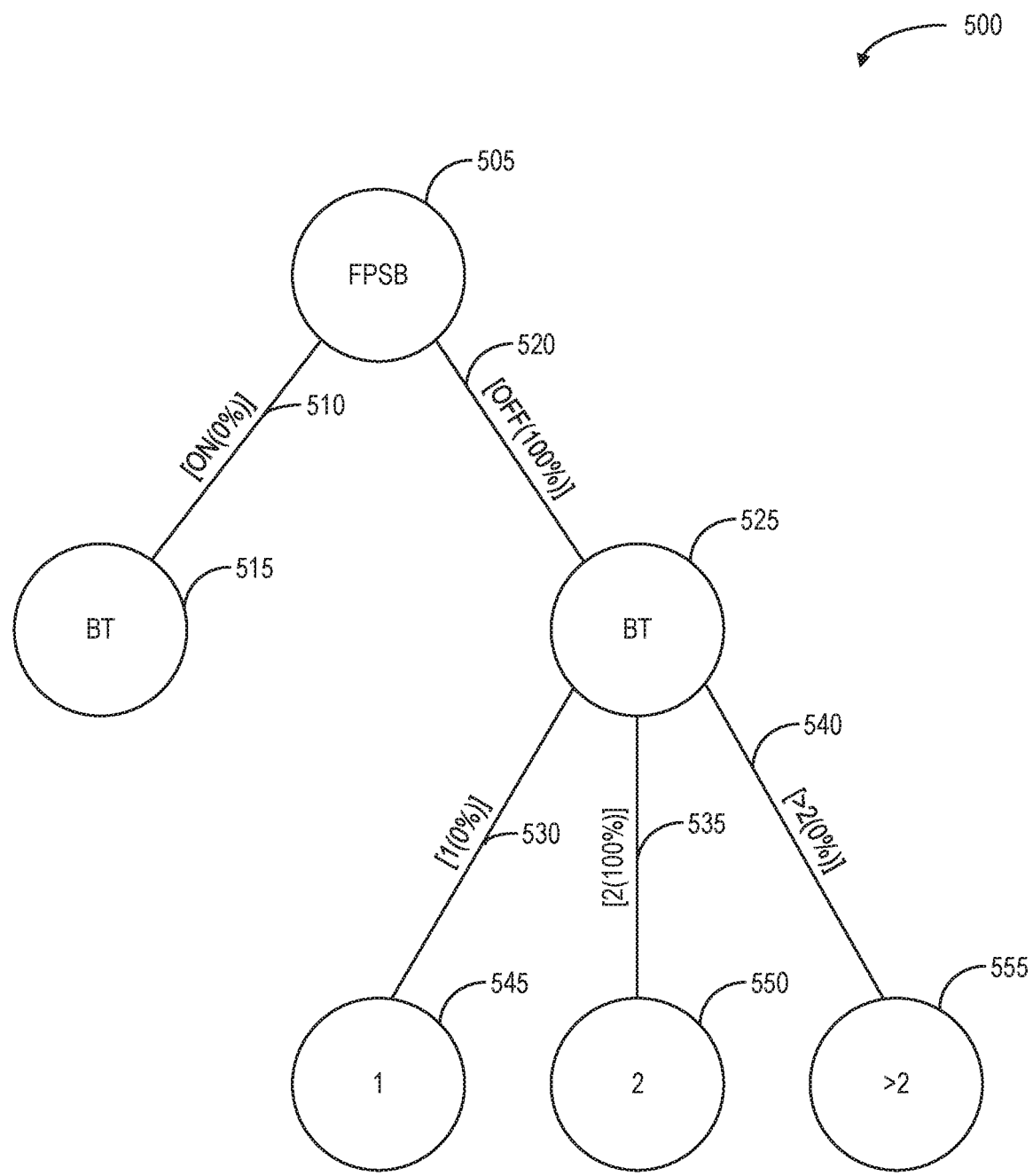
FIG. 5 is an example of a process of determining vehicle occupancy rate.

FIG. 5 illustrates a process flow diagram 500 of a decision tree generated by a transponder system according to an example embodiment. The decision tree includes a plurality of nodes and paths, where each path terminates in a node as discussed below.

Depending on the state of the monitored or sensed parameters received by the transponder system, the transponder system determines the applicable path and accordingly determines the estimated occupancy rate of the vehicle. The process flow diagram is configured such that the decision tree terminates with one or more nodes, where each terminating node corresponds to a predetermined occupancy rate. In various embodiments, the transponder system is configured to select the path with the highest probability in the process flow diagram 500.

In FIG. 5, the process flow diagram 500 has of node 505, which results in two paths depending on the state of the variable analyzed at node 505. For example, at node 505, a transponder system, such as transponder system 140 of FIGS. 3A and 3B, may determine whether the front passenger seat belt parameter is in its first state or second state. If the front passenger seat belt parameter is in its first state (path 510), the transponder system concludes that there is a front seat passenger in the vehicle and enters node 515. However, if the front passenger seat belt parameter is in its second node (path 515), the transponder system enters node 525.

Assuming that the transponder system determines that path 515 has the highest probability, the transponder system next analyzes the state of a Bluetooth signal system, such as Bluetooth signal system 130 of FIGS. 3A and 3B, at node 525. The analysis of Bluetooth signal system 130 can indicate three states, where the first state indicates one connected device (path 530), the second state indicates two connected devices (path 535), and third state indicates more than two connected devices (path 540).

If the transponder system determines that the Bluetooth signal system indicates one connected device, then path 530 is selected and the transponder system concludes that there is one occupant in the vehicle (node 545). If the transponder system determines that the Bluetooth signal system indicates two connected devices, then path 535 is selected and the transponder system concludes that there are two occupants in the vehicle (node 550). And in cases where the transponder system determines that the Bluetooth signal system indicates more than two connected devices, then path 540 is selected and the transponder system concludes that there are three or more occupants in the vehicle (node 555).

Figure 6:
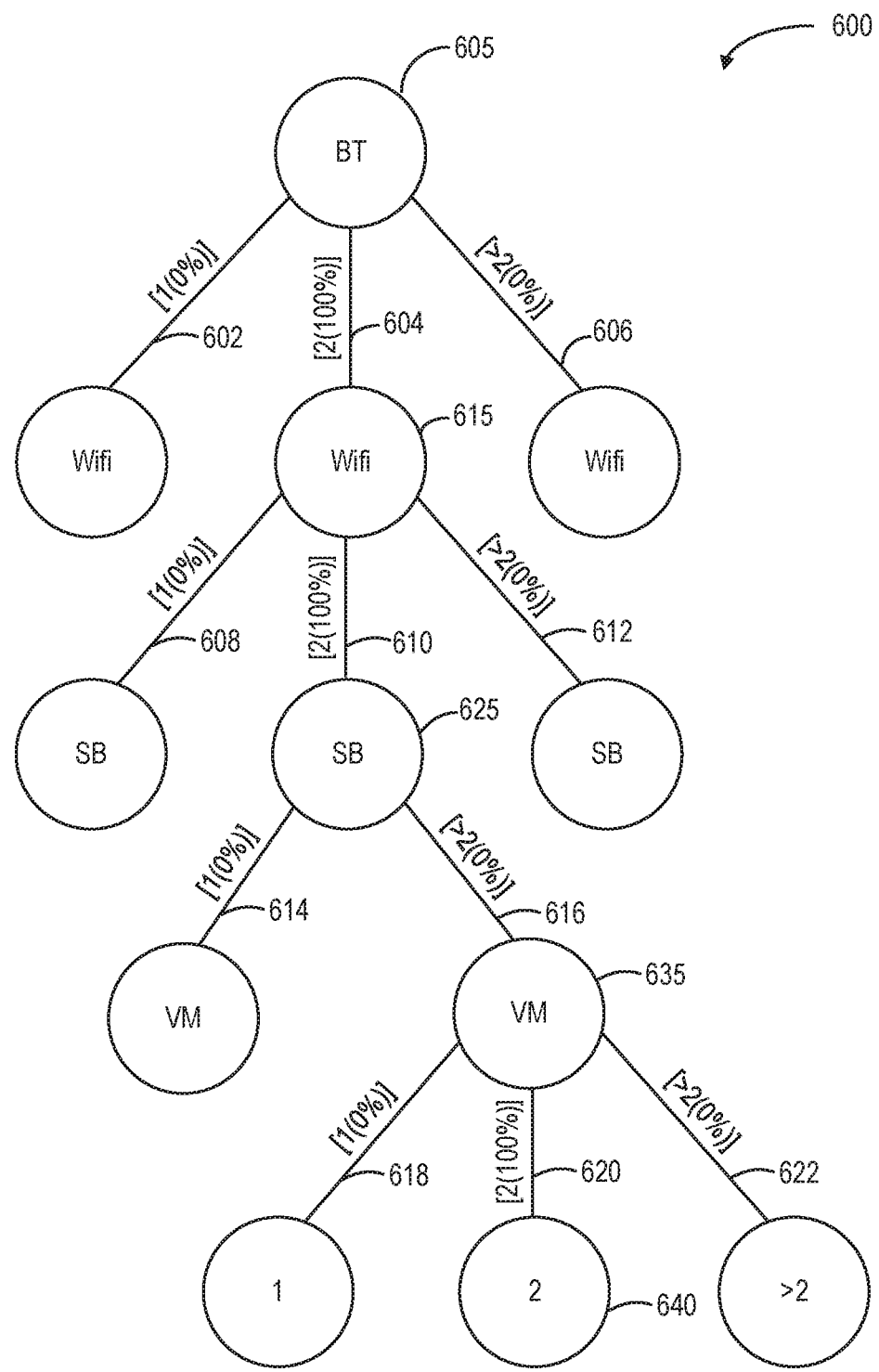
FIG. 6 is another example of a process of determining vehicle occupancy rate.

FIG. 6 illustrates a process flow diagram 600 of a decision tree generated by a transponder system according to one embodiment. Decision tree 600 has a plurality of nodes and paths. Each path terminates in a node as discussed below.

In FIG. 6, process flow diagram 600 has of node 605, which results in three paths depending on the state of the variable analyzed at node 605. E.g., at node 605, the transponder system is configured to determine the number of occupants of the vehicle based on the Bluetooth signal system, such as Bluetooth signal system 130 of FIGS. 3A and 3B. If the transponder system detects the occupancy level of the vehicle to be one, path 602 is selected. If the transponder system detects the occupancy level of the vehicle to be two, path 604 is selected, and if the transponder system detects the occupancy level of the vehicle to be more than two, path 606 is selected. The transponder system may use clustering method, as discussed below, to determine the occupancy level of the vehicle based on the Bluetooth signal system.

Assuming that the transponder system detects the occupancy level of the vehicle to be two, path 604 is selected.

Path 604 terminates at node 615. At node 615, the transponder system is configured to determine the number of occupants of the vehicle based on the WiFi signal system, such as the WiFi signal system 135. If the transponder system detects the occupancy level of the vehicle to be one, path 608 is selected. If the transponder system detects the occupancy level of the vehicle to be two, path 610 is selected, and if the transponder system detects the occupancy level of the vehicle to be more than two, path 612 is selected. Similar to the case of Bluetooth signal system, the transponder system may use clustering method, as discussed below, to determine the occupancy level of the vehicle based on the WiFi signal system.

Assuming that the transponder system detects the occupancy level of the vehicle to be two, path 610 is selected. Path 610 terminates at node 625. At node 625, the transponder system is configured to determine whether the seat belt parameter is in its first state or the second state. If the seat belt parameter is in its first state (path 614), the transponder system concludes that only one seat belt is engaged in the vehicle, and accordingly only occupant is in the vehicle. However, if the seat belt parameter is in its second state (path 616), the transponder system concludes that there are two or more occupants in the vehicle.

Assuming that the transponder system detects the occupancy level of the vehicle to be two or more, path 616 is selected, which terminates at node 635. At node 635, the transponder system is configured to determine the occupancy level of the vehicle based on the vehicle mass. If the transponder system detects the occupancy level of the vehicle to be one based on the vehicle mass, path 618 is selected. If the transponder system detects the occupancy level of the vehicle, based on the vehicle mass, to be two, path 620 is selected. Similarly, if the transponder system detects the occupancy level of the vehicle to be more than two based on the vehicle mass, path 622 is selected. Assuming that based on the vehicle mass, the transponder system detects the occupancy level of the vehicle to be two, path 620 is selected and the path terminates at node 640.

FIG. 4 illustrates a block diagram of a transponder system 400 according to an example embodiment. System 400 is provided as an example and there can be other embodiments of system 400 with different components or a different configuration of the components described herein.

System 400 includes a processing unit 405, a communication unit 410, a user interface unit 415, and a memory unit 420. The memory unit 420 includes software code for implementing an operating system 425, various programs 430, a data input module 435, an occupancy rate generation module 440, an occupancy rate update module 445 and one or more databases 450.

Processing unit 405 controls the operation of the transponder system. Processing unit 405 can be any suitable processor, controller or digital signal processor that can provide sufficient processing power depending on the configuration, purposes and requirements of the transponder system. For example, processing unit 405 may be a high performance general processor. In alternative embodiments, processing unit 405 can include more than one processor with each processor being configured to perform different dedicated tasks.

The communication unit 410 can include wired or wireless connection capabilities that allows the transponder system to communicate with other devices or computers. In some cases, communication unit 410 can include at least one of a serial port, a parallel port or a USB port that provides USB connectivity. Communication unit 410 can also include at least one of an Internet, Local Area Network (LAN), Ethernet, Firewire, modem or digital subscriber line connection. Communication unit 410 can also include a bus connection or a radio that communicates utilizing RF, CDMA, GSM, GPRS, DSRC or Bluetooth protocol according to standards such as IEEE 802.11a, 802.11b, 802.11g, or 802.11n.

User interface unit 415 can include at least one of a keyboard, a touch screen, a touch-pad, a thumbwheel, a track-pad, a track-ball, a card-reader, voice recognition software and the like depending on the particular implementation of the transponder system. In some cases, some of these components can be integrated with one another. User interface unit 415 can provide display capabilities to the transponder system. User interface unit 415 can also provide input capabilities to the transponder system so that the transponder system can receive user entered inputs.

Memory unit 420 can include RAM, ROM, one or more hard drives, one or more flash drives or some other suitable data storage elements such as disk drives, etc. Memory unit 420 is used to store an operating system 425 and programs 430 as is commonly known by those skilled in the art. For instance, operating system 425 provides various basic operational processes for the transponder system. Programs 430 include various user programs so that a user can interact with the transponder system to perform various functions such as, but not limited to, viewing and manipulating data as well as sending signals as the case may be.

Memory unit 420 may also accept data from one or more data sources, such as vehicle sensor system, Bluetooth sensor system and WiFi sensor system. Memory unit 420 uses the received data to define and store input records. For example, each input record may identify a type of input parameter (such as, an operating parameter or a sensed parameter) monitored by the data sources, an identifier corresponding to the data source, the time of monitoring, and the corresponding measurement, value or state for the respective input parameter.

Databases 450 can be used to store data required for the operation of the programs 430 or operating system 445 such as dynamically linked libraries and the like. An example of database 450 stored in memory unit 420 includes historical trends.

The data input module 435 interacts with at least one of memory unit 420 and databases 450 for receiving input parameters and corresponding measurements from a variety of data sources, such as data sources 160 of FIGS. 3A and 3B. In some cases, input module 435 may receive input parameters and corresponding measurements via user interface unit 415 where a user may manually enter the measurements for vehicle operating parameters and other sensory measurements that can be used by the transponder system to determine the occupancy rate of the vehicle.

The occupancy rate generation module 440 interacts with at least one of memory unit 420 and databases 450, and is configured to receive input parameters and corresponding measurements or states from data input module 435. The occupancy rate generation module 440 is further configured to analyze the received measurements or states of various input parameters and generate an estimated vehicle occupancy rate as discussed herein.

The occupancy rate update module 445 interacts with at least one of memory unit 420 and databases 450 and is configured to receive an update to the estimated vehicle occupancy rate to accurately reflect the actual number of passengers in the vehicle. The update to the vehicle occupancy rate can be received directly at user interface unit 415 by an occupant of the vehicle, or indirectly via communication unit 410 from a mobile device associated with an occupant of the vehicle, or another device.

Figure 8:
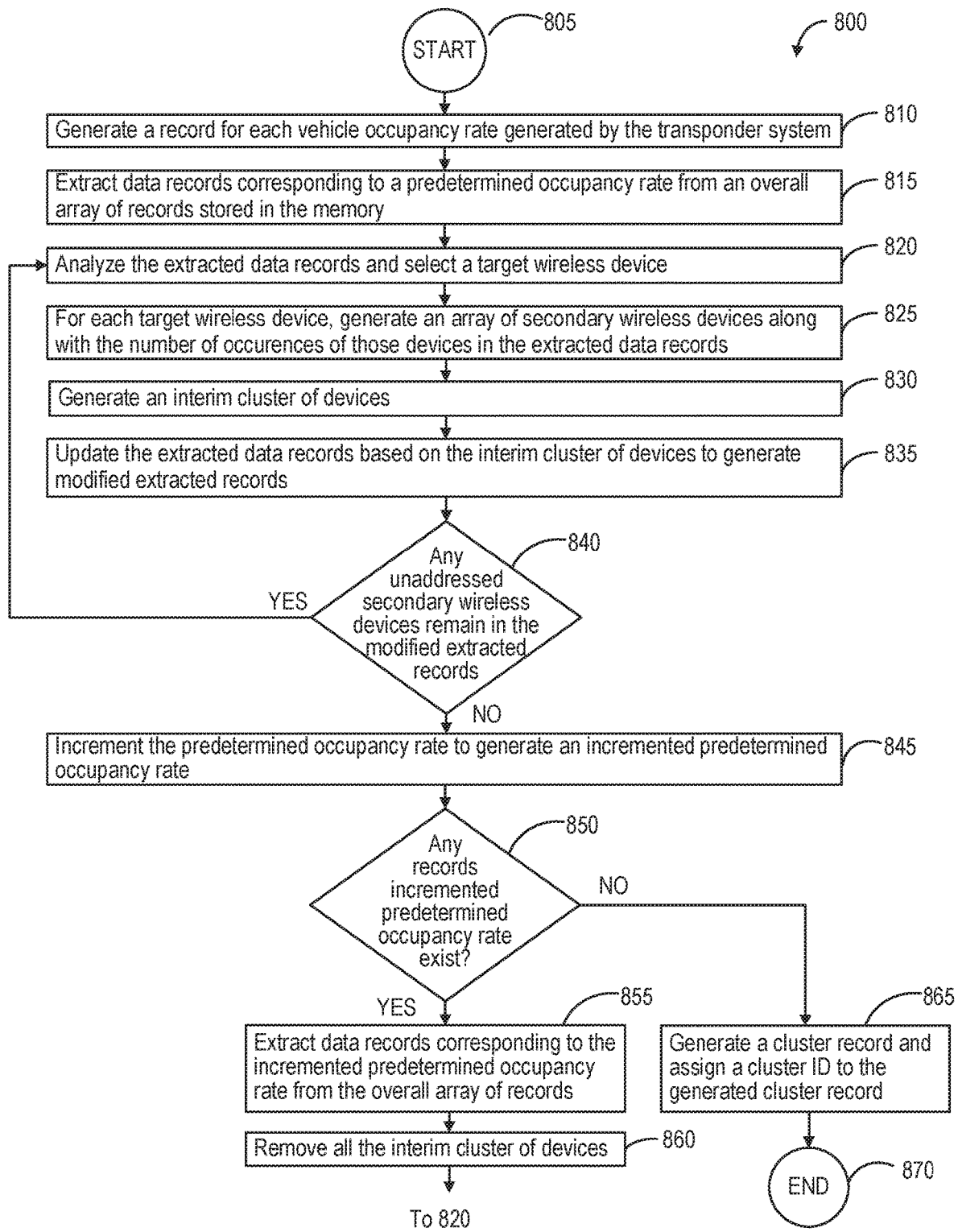
FIG. 8 is an example of a process of clustering wireless devices together.

Reference is next made to FIG. 8, illustrating an example embodiment of a clustering method 800 in accordance with the teachings herein. Method 800 is carried out by the various modules of a transponder system, such as transponder system 400. In various embodiments, the transponder system is configured to use the clustering method 800 to determine an association between various Bluetooth and/or WiFi enabled devices detected by the transponder system and the number of passengers occupying the vehicle. For example, in scenarios where one or more passengers occupying the vehicle have more than one corresponding Bluetooth and/or WiFi enabled devices, the transponder system is configured to cluster the various detected devices belonging to the same passenger together. This prevents the transponder system from overestimating the number of occupants in the vehicle.

The method starts at 805. At 810, the transponder system is configured to generate a record every time a final vehicle occupancy rate signal, such as the final vehicle occupancy rate signal 144, is generated. The generated record includes the declared occupancy rate parameter and the various wireless devices detected by the transponder system at that time. The various wireless devices detected by the transponder system may include Bluetooth emitting devices, WiFi emitting devices, or both. The generated records are stored in the memory of the transponder system.

At 815, the transponder system is configured to extract data records corresponding to a predetermined occupancy rate from the overall array of records stored in the memory of the transponder system. The predetermined occupancy rate can be an occupancy rate of one, two, three, four or more. The occupancy rates are determined based on the value of the declared occupancy rate parameter stored within the records. For example, if the predetermined occupancy rate of 815 is selected to be single occupancy rate, then all the records where the value of the declared occupancy rate parameter is one are extracted.

At 820, the extracted data records are analyzed by the processor, and for each record, a target wireless device is selected. The target wireless device may be selected based on the most frequently identified device in the extracted records. For example, if the single occupancy records are extracted at 815, then the wireless device that appears most frequently in the extracted records is determined to be the target wireless device.

At 825, for each target wireless device, an array of secondary wireless devices along with the number of occurrences of those devices in the extracted records is generated. The secondary wireless devices refers to those wireless devices, other than the target wireless device, that are present in the extracted records. For example, if the target wireless device is selected to be device 'A' and the extracted records also identify wireless devices 'B', 'C' and 'D', then an array of each one of the secondary wireless devices 'B', 'C' and 'D' along with the number of occurrences of those devices in the extracted data records will also be generated.

At 830, an interim cluster of devices is generated. The interim cluster of devices refers to an interim prediction of one or more devices belonging to the same occupant. The interim cluster of devices generated contains the target wireless device, and potentially an additional one or more secondary wireless devices. Whether or not one or more secondary wireless devices can be clustered with the target wireless device is determined by the transponder system based on the number of occurrence of the secondary wireless devices in the extracted records. In some cases, the transponder system is configured to compare the number of occurrence of each secondary wireless device to a predetermined threshold to determine whether or not each secondary wireless device can be clustered with the target wireless device. The predetermined threshold may be a number, a percentage etc. As well, the predetermined threshold may be expressed in comparison to the number of occurrence of the target wireless device, such as, for example, '80% of the number of occurrence of the target wireless device in the extracted records'.

At 835, the extracted data records are updated based on the interim cluster of devices to generate modified extracted records. In particular, the extracted records are updated to remove the interim cluster of devices generated at 830. For those updated extracted records that do not have any remaining wireless devices, the extracted records are tagged as complete, and the interim cluster of devices is stored in the transponder system.

At 840, the transponder system determines if any unaddressed secondary wireless device remains in the modified extracted records. If so, the method proceeds to 820, where a new target wireless device is selected from the updated extracted records, and steps 820-835 are repeated for the updated extracted records. If, however, at 840, it is determined that all the wireless devices have been addressed, then the method proceeds to 845.

At 845, the predetermined occupancy rate is incremented by one to generate an incremented predetermined occupancy rate. The method then proceeds to 850, where the transponder system determines if any records containing the incremented predetermined occupancy rate are stored in the memory. If so, the method proceeds to 855. And, if no records containing the incremented predetermined occupancy rate are located in the memory, then the method proceeds to 865.

At 855, the transponder system is configured to extract data records corresponding to the incremented predetermined occupancy rate from the overall array of records stored in the memory of the transponder system.

At 860, the transponder system is configured to remove all the interim cluster of devices detected at 825, and for instances where the interim cluster of devices are detected in the extracted data records, the occupancy rate corresponding to the extracted data records is reduced accordingly. For example, if two sets of interim cluster of devices are detected in one or more of the extracted records, then the occupancy rate corresponding to those one or more of the extracted records is reduced by two. Next, the method proceeds to 820.

At 865, a cluster record is generated in the transponder system, where the various interim cluster of devices generated at 825 are assigned a cluster identifier or ID. The method stops at 870.

The various embodiments of the devices, systems and methods described above may be implemented using a combination of hardware and software. These embodiments may be implemented in part using computer programs executing on programmable devices, each programmable device including at least one processor, an operating system, one or more data stores (including volatile memory or non-volatile memory or other data storage elements or a combination thereof), at least one communication interface and any other associated hardware and software that is necessary to implement the functionality of at least one of the embodiments described herein. For example, and without limitation, the computing device may be a server, a network appliance, an embedded device, a computer expansion module, a personal computer, a laptop, a personal data assistant, a cellular telephone, a smart-phone device, a tablet computer, a wireless device or any other computing device capable of being configured to carry out the methods described herein. The particular embodiment depends on the application of the computing device.

In some embodiments, the communication interface may be a network communication interface, a USB connection or another suitable connection as is known by those skilled in the art. In other embodiments, the communication interface may be a software communication interface, such as those for inter-process communication (IPC). In still other embodiments, there may be a combination of communication interfaces implemented as hardware, software, and a combination thereof. In at least some of the embodiments described herein, program code may be applied to input data to perform at least some of the functions described herein and to generate output information. The output information may be applied to one or more output devices, for display or for further processing.

At least some of the embodiments described herein that use programs may be implemented in a high level procedural or object oriented programming and/or scripting language or both. Accordingly, the program code may be written in C, Java, SQL or any other suitable programming language and may comprise modules or classes, as is known to those skilled in object oriented programming. However, other programs may be implemented in assembly, machine language or firmware as needed. In either case, the language may be a compiled or interpreted language.

The computer programs may be stored on a storage media (e.g. a computer readable medium such as, but not limited to, ROM, magnetic disk, optical disc) or a device that is readable by a general or special purpose computing device. The program code, when read by the computing device, configures the computing device to operate in a new, specific and predefined manner in order to perform at least one of the methods described herein. Furthermore, some of the programs associated with the system, processes and methods of the embodiments described herein are capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. In alternative embodiments the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

The embodiments illustrated and described above illustrate individual non-limiting examples in which the principles of the present invention are employed. It is possible to make other embodiments that employ the principles of the invention and that fall within the following claims. To the extent that the features of those examples are not mutually exclusive of each other, the features of the various embodiments may be mixed-and-matched, i.e., combined, in such manner as may be appropriate, without having to resort to repetitive description of those features in respect of each possible combination or permutation. The invention is not limited to the specific examples or details which are given by way of illustration herein, but only by the claims, as mandated by law. The claims are to be given the benefit of purposive interpretation to include equivalents under the doctrine of equivalents.

It should also be noted that the terms "coupled" or "coupling" as used herein can have several different meanings depending in the context in which the term is used. For example, the term coupling can have a mechanical or electrical connotation. For example, as used herein, the terms "coupled" or "coupling" can indicate that two elements or devices can be directly connected to one another or connected to one another through one or more intermediate elements or devices via an electrical element, electrical signal or a mechanical element such as but not limited to, a wire or a cable, for example, depending on the particular context.

It should be noted that terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed.

The invention claimed is:

1. A method of determining an occupancy count for a vehicle, the occupancy count corresponding to a number of occupants in a vehicle, the method being implemented by a transponder located in the vehicle, the transponder having a processor and a memory coupled to the processor and in which to store instructions executable by the processor, the method comprising:

receiving, at the processor, a plurality of occupancy data signals from a corresponding at least one occupancy data source;

storing, in the memory, a plurality of occupancy data source records;

each said occupancy data source record corresponding to each occupancy data signal received at the processor;

analyzing, at the processor, the plurality of occupancy data signals to identify a state of each of the at least one occupancy data source for a duration of time, the duration of time being marked by a starting time and a stopping time of the vehicle;

processing the plurality of occupancy data signals based on the identified state of the corresponding occupancy data source;

determining an estimated occupancy count corresponding to the occupancy count of the vehicle based on the processing of the plurality of occupancy data signals;

providing a signal corresponding to the estimated occupancy count to a display system, wherein the display system is configured to display the estimated occupancy count for verification by at least one of the occupants of the vehicle;

receiving a verification input from the at least one of the occupants of the vehicle at a user interface of the display system; and in response to the verification input indicating a different occupancy count compared with the estimated occupancy count:

updating the estimated occupancy count based on the verification input;
transmitting the updated occupancy count to an external server; and
transmitting, to the external server, an alert indicating that the estimated occupancy count was updated based on the verification input.

2. The method of claim 1, wherein the at least one occupancy data source comprises an engine control unit monitoring an engine of the vehicle, and wherein the method further comprises:
monitoring, by the engine control unit, one or more engine parameters corresponding to the vehicle;
receiving, at the processor, a data value corresponding to each of the one or more engine parameters; and
determining, by the processor, mass of the vehicle based on the received data values.

3. The method of claim 1, wherein at least one engine parameter comprises speed of the vehicle.

4. The method of claim 1, wherein at least one engine parameter comprises engine load corresponding to the engine of the vehicle.

5. The method of claim 1, wherein at least one engine parameter comprises rotational speed (engine RPM) of the vehicle.

6. The method of claim 1, wherein at least one engine parameter comprises throttle position of the vehicle.

7. The method of claim 1, the transponder further having an accelerometer, and the method comprises:
receiving, by the processor, acceleration data corresponding to acceleration of the vehicle from the accelerometer.

8. The method of claim 1, further comprising:
determining, by the processor, a plurality of gear levels corresponding to the vehicle based on a ratio of the rotational speed (engine RPM) of the vehicle to the speed of the vehicle; and
determining, by the processor, for each gear level, a vehicle mass based on the acceleration data, throttle position and engine load.

9. The method of claim 1, wherein the at least one occupancy data source comprises an electronic device coupled to the vehicle via an auxiliary connection, the electronic device being operable to communicate with the vehicle, wherein the method comprises:
receiving, by the processor, at least one auxiliary connection information signal from at least one electronic device;
determining a signal strength of the at least one auxiliary connection information signal;
determining the location of the at least one electronic device based on the signal strength of the at least one auxiliary connection information signal; and
if the location of the at least one electronic device is determined to be within the vehicle, determining the estimated occupancy count of the vehicle based on the at least one electronic device.

10. The method of claim 9, wherein the auxiliary connection comprises a Bluetooth connection, and wherein the at least one auxiliary connection information signal comprises a Bluetooth signal.

11. The method of claim 1, wherein the at least one occupancy data source comprises a seat belt sensor array corresponding to the vehicle, the seat belt sensor array comprising one or more seat belt sensors wherein each seat belt sensor is uniquely associated with a seat and is configured to detect engagement of the corresponding seat belt, wherein the method further comprises:
receiving, by the processor, at least one seat belt information signal from a corresponding seat belt sensor; and
determining the estimated occupancy count of the vehicle based on the at least one seat belt information signal.

12. The method of claim 11, further comprising:
receiving, by the processor, at least one pressure sensor information signal from a corresponding pressure sensor;
determining, by the processor, if a pressure sensor corresponding to the at least one seat belt sensor transmitting the at least one seat belt information signal is engaged; and
determining the estimated occupancy count of the vehicle based on the at least one seat belt information signal and the corresponding pressure sensor information signal.

13. The method of claim 1, wherein the at least one occupancy data source comprises at least one mobile device associated with an occupant of the vehicle, and wherein the method further comprises:
receiving, by the processor, a plurality of incoming data packets from a plurality of mobile devices coupled to the vehicle, wherein each incoming data packet corresponding to a same mobile device comprising a signature uniquely corresponding to that mobile device;
analyzing each of the plurality of incoming data packets based on the corresponding signature; and
determining the estimated occupancy count of the vehicle based on the analysis of each incoming data packet.

14. The method of claim 13, where the unique signature comprises a unique MAC address associated with each mobile device.

15. The method of claim 13, further comprising:
determining, by the processor, a signal strength associated with each incoming data packet;
comparing the signal strength of each incoming data packet to a predetermined threshold signal strength;
filtering the incoming data packets based on the corresponding signal strengths to generate filtered data packets; and
determining the estimated occupancy count of the vehicle based on the filtered data packets.

16. A transponder system for determining an occupancy count for a vehicle, the occupancy count corresponding to a number of occupants in a vehicle, the transponder system comprising:
a processor unit; and
a memory unit coupled to the processor unit and configured to store instructions executable by the processor unit;
the processor unit being configured to:
receive a plurality of occupancy data signals from a corresponding at least one occupancy data sources;
store, in the memory, a plurality of occupancy data source records, each said occupancy data source record corresponds to each occupancy data signal received at the processor;
analyze the plurality of data signals to identify a state of each of the at least one occupancy data sources for a duration of time, the duration of time being marked by a starting time and a stopping time of the vehicle;
process the plurality of occupancy data signals based on the identified state of the corresponding occupancy data source;

determine an estimated occupancy count corresponding to the vehicle based on the processing of the plurality of occupancy data signals;

provide a signal corresponding to the estimated occupancy count to a display system, wherein the display system is configured to display the estimated occupancy count for verification by at least one of the occupants of the vehicle;

receive a verification input from the at least one of the occupants of the vehicle at a user interface; and in response to the verification input indicating a different occupancy count compared with the estimated occupancy count:

update the estimated occupancy count based on the verification input;

transmit the updated occupancy count to an external server; and transmit, to the external server, an alert indicating that the estimated occupancy count was updated based on the verification input.

17. The transponder system of claim 16, wherein the at least one occupancy data source comprises an engine control unit monitoring an engine of the vehicle, and wherein the processor unit is further configured to:

monitor, by the engine control unit, one or more engine parameters corresponding to the vehicle;

receive, at the processor, a data value corresponding to each of the one or more engine parameters; and determine, by the processor, mass of the vehicle based on the received data values.

18. A computer-readable non-transitory medium storing computer-executable instructions, the instructions for causing a processor to perform a method of determining an occupancy count for a vehicle, the occupancy count corresponding to a number of occupants in a vehicle, the method comprising:

receiving a plurality of occupancy data signals from a corresponding at least one occupancy data sources;

storing, in a memory, a plurality of occupancy data source records, each said occupancy data source record corresponds to each occupancy data signal received at the processor;

analyzing the plurality of occupancy data signals to identify a state of each of the at least one occupancy data sources for a duration of time, the duration of time being marked by a starting time and a stopping time of the vehicle;

processing the plurality of data signals based on the identified state of the corresponding data source;

generating an estimated occupancy count corresponding to the vehicle based on the processing of the plurality of occupancy data signals;

providing a signal corresponding to the estimated occupancy count to a display system, wherein the display system is configured to display the estimated occupancy count for verification by at least one of the occupants of the vehicle;

receiving a verification input from the at least one of the occupants of the vehicle at a user interface; and in response to the verification input indicating a different occupancy count compared with the estimated occupancy count:

updating the estimated occupancy count based on the verification input;

transmitting the updated occupancy count to an external server; and transmitting, to the external server, an alert indicating that the estimated occupancy count was updated based on the verification input.

19. The computer readable non-transitory medium of claim 18, wherein the at least one occupancy data source comprises an engine control unit monitoring an engine of the vehicle, and wherein the method further comprises:

monitoring, by the engine control unit, one or more engine parameters corresponding to the vehicle;

receiving, at the processor, a data value corresponding to each of the one or more engine parameters; and determining, by the processor, mass of the vehicle based on the received data values.

* * * * *